United States Patent [19]

Brown

[11] Patent Number: 4,700,378
[45] Date of Patent: Oct. 13, 1987

[54] DATA BASE ACCESSING SYSTEM

[76] Inventor: Daniel G. Brown, 3041 Jeffrey, No. B, Costa Mesa, Calif. 92626

[21] Appl. No.: 763,921

[22] Filed: Aug. 8, 1985

[51] Int. Cl.$^4$ .......................................... H04M 11/00
[52] U.S. Cl. ........................................ 379/96; 379/95
[58] Field of Search ........... 179/2 DP, 2 TV; 358/85; 178/22.01; 364/900 MS File; 379/53, 93, 95, 96; 380/3, 4

[56] References Cited

U.S. PATENT DOCUMENTS

| | | | |
|---|---|---|---|
| 3,984,638 | 10/1976 | Carrouge | 179/2 DP |
| 4,465,901 | 8/1984 | Best | 178/22.08 |
| 4,500,751 | 2/1985 | Darland et al. | 179/2 DP |
| 4,581,484 | 4/1986 | Bendig | 179/2 DP |

FOREIGN PATENT DOCUMENTS

| | | | |
|---|---|---|---|
| 2734714 | 1/1979 | Fed. Rep. of Germany | 179/2 TV |
| 2105950 | 3/1983 | United Kingdom | 179/2 DP |

OTHER PUBLICATIONS

Chrisfield et al., "Time Sharing Circuit for Voice and FSK Data," *IBM Technical Disclosure Bulletin*, vol. 17, No. 2, pp. 477–478, Jul. 1974.

Primary Examiner—Keith E. George
Attorney, Agent, or Firm—Weissenberger & Peterson

[57] ABSTRACT

Inexpensive communication is provided between a data base and a plurality of subscribers each equipped with only a telephone and a TV set by using only tone signals to communicate from the subscribers to the data base, and data signals at least partially to communicate from the data base to the subscribers. For this purpose, each subscriber location needs to be provided with only the demodulator portion of a modem, and the base location needs to be provided only with the modulator portion of a modem and a tone decoder. A microprocessor-controlled security device is disclosed for remotely disabling a subscriber's module in case of misuse.

2 Claims, 5 Drawing Figures

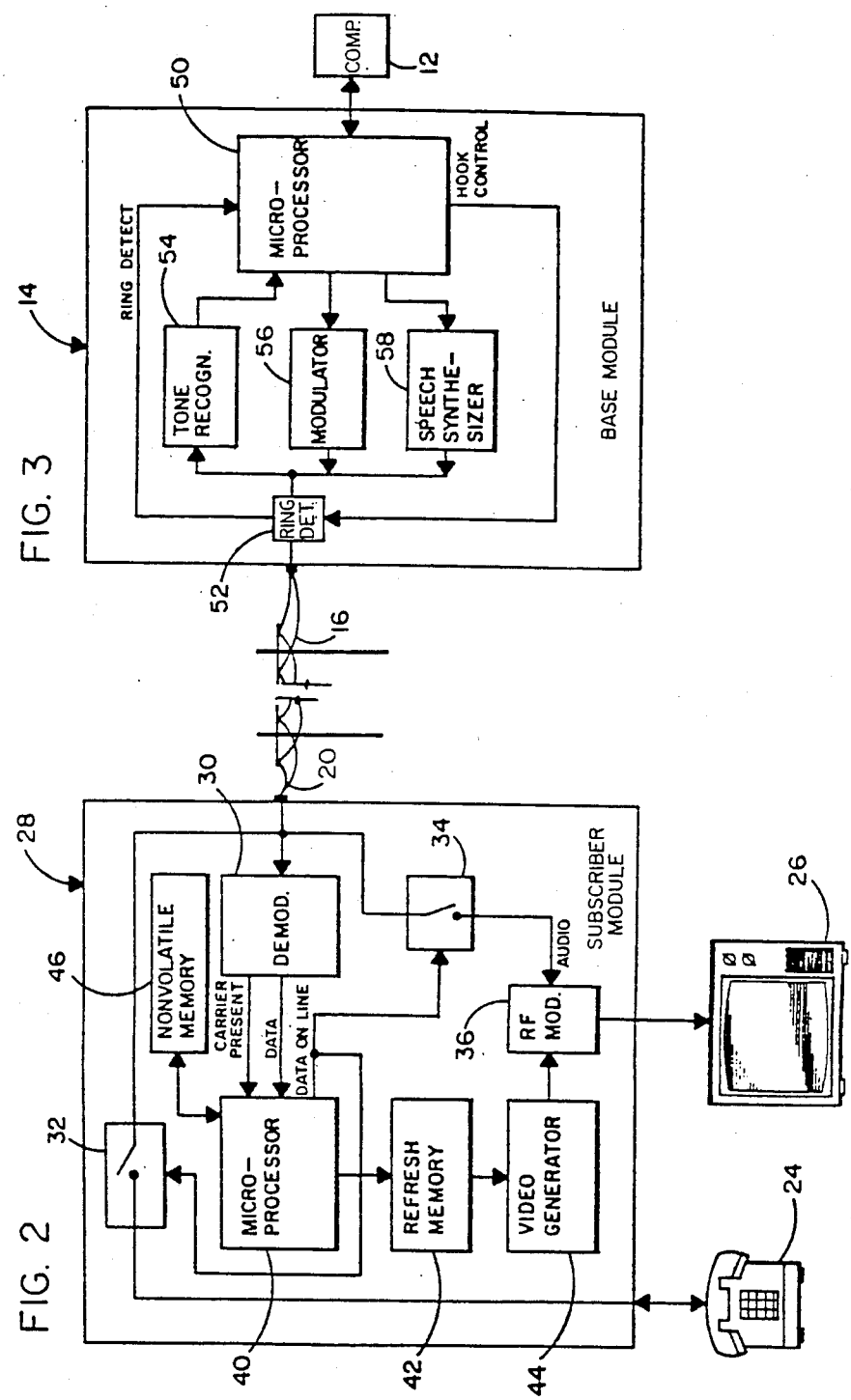

DATA BASE ACCESSING SYSTEM

FIELD OF THE INVENTION

This invention relates to communication systems, and more specifically to a telephone data retrieval system which communicates by audio signals in one direction and by digital signals in the other.

BACKGROUND OF THE INVENTION

Systems for accessing a data base over telephone lines and displaying the received information on a television set are well known. A disadvantage of such systems, however, is the fact that a computer keyboard is needed at each user location to format the communication from the user to the data base into a digital code such as ASCII which the data base can understand when it is transmitted over the telephone line.

A communication system of this prior art type requires two bidirectional modems (modulator-demodulator combinations) to translate the digital code into a frequency-shift keyed tone sequence transmitted over the telephone line, and back into digital code again at the other end. Modems and keyboards are relatively expensive and, if not well built, may present maintenance problems in a home environment. As a result, marginal users of a data service are deterred from subscribing to the service.

SUMMARY OF THE INVENTION

The present invention considerably improves the cost, reliability and ease of use of data services by providing a system in which communications from the subscriber to the data base are audio signals, while communications from the data base to the subscriber are digital code signals.

As a result, the system of this invention requires only a telephone, a television set or monitor, a demodulator (the receive portion of a modem), a small microprocessor, and a conventional video generator and (in the case of a TV set) RF modulator at the subscriber location. Because of the tolerances and power requirements involved, the demodulator is usually the less expensive part of a modem. Thus, the subscriber-end apparatus can be provided at very low cost.

At the data service or base end of the telephone line, only one modulator (the transmit portion of a modem) and a small microprocessor is required to service a substantial number of subscribers. If desired, a speech synthesizer may be added to provide voice instructions to the subscribers.

The data base is accessed from the subscriber end by merely calling the data base and transmitting a predetermined sequence of tones with the aid of the telephone keypad. The microprocessor at the base end stores the transmitted signals, and in due course translates them into a digital code suitable for operation of the data base. The data base responds in digital form through the modulator, and the demodulator and associated microprocessor at the subscriber end operates the television display in accordance with the received digital data.

In accordance with one aspect of the invention, the subscriber end electronics are arranged to actuate a permanent memory or physical switch or fuse in such a way as to disable itself in response to the receipt of a predetermined digital security signal by the demodulator.

It is therefore the object of the invention to provide a simple, inexpensive system for accessing a data base by telephone and displaying its data on a television set.

It is a further object of the invention to achieve the foregoing result by transmitting audio signals in one direction and digital signals in the other.

It is another object of the invention to provide a system of the type described which can be remotely disabled by the data service.

BRIEF DESCRIPTION OF THE DRAWINGS

FIG. 2 is a block diagram of the subscriber end components of the system;

FIG. 3 is a block diagram of the base end components of the system;

DESCRIPTION OF THE PREFERRED EMBODIMENT

Figure 1:
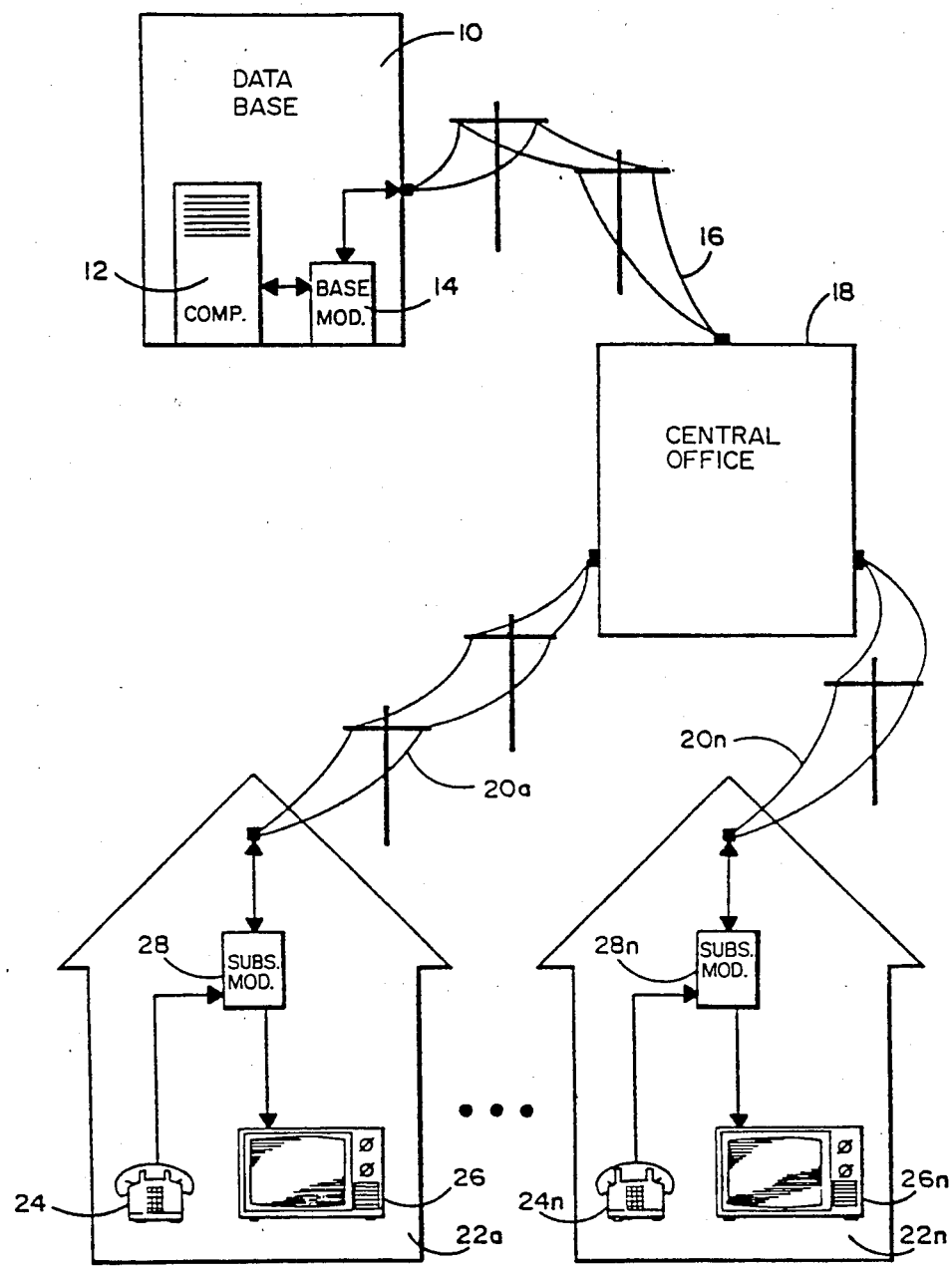
FIG. 1 is a schematic diagram of the overall system of this invention.

FIG. 1 shows the overall nature of the system of this invention. A data service, such as an information network or a banking facility, situated at a base location 10 has a data base stored in a computer 12. The computer 12 is connected through a base module 14 to a telephone line 16. The telephone line 16 is in turn selectively connected through a central office 18 and telephone lines 20a through 20n to any one of a plurality of subscriber locations 22a through 22n, each of which is equipped with a telephone 24, a television set or monitor 26, and a subscriber module 28. The object of the system is to access the data base computer 12 by using the keypad of the telephone 24, and to have the requested data displayed on the television set 26.

FIG. 2 shows the subscriber module 28 in more detail. The telephone line 20 is connected to a demodulator 30, and through electronic switches 32 and 34, respectively, to the telephone 24 and the audio input of the conventional radio-frequency modulator 36 which drives the television set 26. The switches 32, 34 are actuated by the microprocessor 40 to prevent data transmission sounds from being heard whenever the demodulator 30 detects the presence of a data carrier on the telephone line 20. The demodulator 30 may be of conventional design to translate frequency-shift keyed signals on the telephone line 20 into data pulses suitable for application to the microprocessor 40.

The microprocessor 40 receives the data transmitted by the data base over telephone line 20 and stores it in a refresh memory 42 in a format which allows the conventional video generator 44 to translate the data into a visual image pattern suitable for application to a monitor directly, or to the television set 26 through the RF modulator 36.

In accordance with one aspect of the invention, a security system may be provided by which the data service can disable the subscriber module 28 of any subscriber who attempts an unauthorized access to the data base. For this purpose, an enabling code is stored in a nonvolatile "fuse" memory 46. As shown in the flow chart of FIG. 4, the microprocessor 40 checks the presence of that code before executing any commands. In response to a predetermined disable or "suicide" command code transmitted by the data service, the microprocessor 40 is programmed to erase the enabling code from the nonvolatile memory 46. At the same time, the microprocessor 40 may cause the television set 26 to display a message such as "Module-Disabled—Return to Data Service".

FIG. 3 shows the details of the base module 14. A microprocessor 50 is actuated by a ring detector 52 of conventional construction to take the telephone line 16 off-hook. A tone recognition circuit 54 translates the tones produced by the keypad of telephone 24 into numerical codes intelligible to the microprocessor 50. The microprocessor 50 in turn transmits to the computer 12 an appropriate access code corresponding to the tone sequence keyed in by the subscriber.

Under control of the computer 12, the microprocessor 50 directs data from the data base either into a modulator 56 for conversion into frequency-shift keyed signals, or into a conventional speech synthesizer 58 for the generation of spoken instructions which can be heard by the subscriber. At the end of the data transmission, the microprocessor 50, under the control of computer 12, causes the telephone line to go back on-hook.

Figure 4:
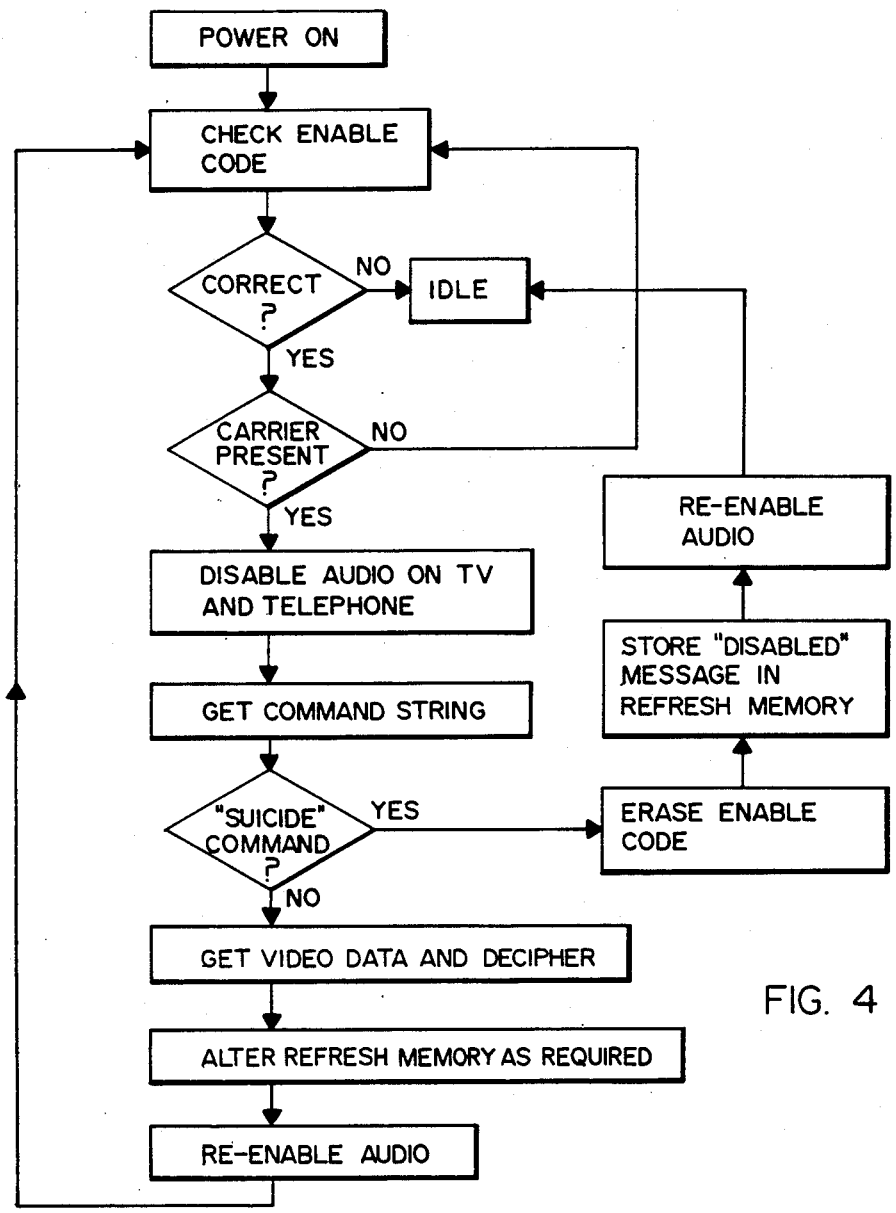
FIG. 4 is a flow chart of the subscriber end processor program.

FIG. 4 illustrates, in general terms, the program of the subscriber module microprocessor 40. The microprocessor 40 continually checks itself as long as no carrier is present on the telephone line, to determine whether the proper enabling code is stored in its memory. If no correct enabling code is present, the microprocessor 40 goes into an idle mode in which it does not accept any data.

As soon as a carrier appears on the telephone line, the microprocessor 40 opens switches 32 and 34 to disconnect the telephone 24 and the audio input of the RF modulator 36 from the telephone line 20, and then listens for a command from the computer 12. If the command is of a nature to indicate a forthcoming data transmission (as opposed to the "suicide" code discussed above) the microprocessor receives the data, deciphers it, and stores it in memory for the purpose of producing whatever video display may be required. When the data transmission has been completed, the microprocessor 40 re-closes switches 32 and 34 and goes back to checking itself for the presence of the correct enabling code.

Figure 5:
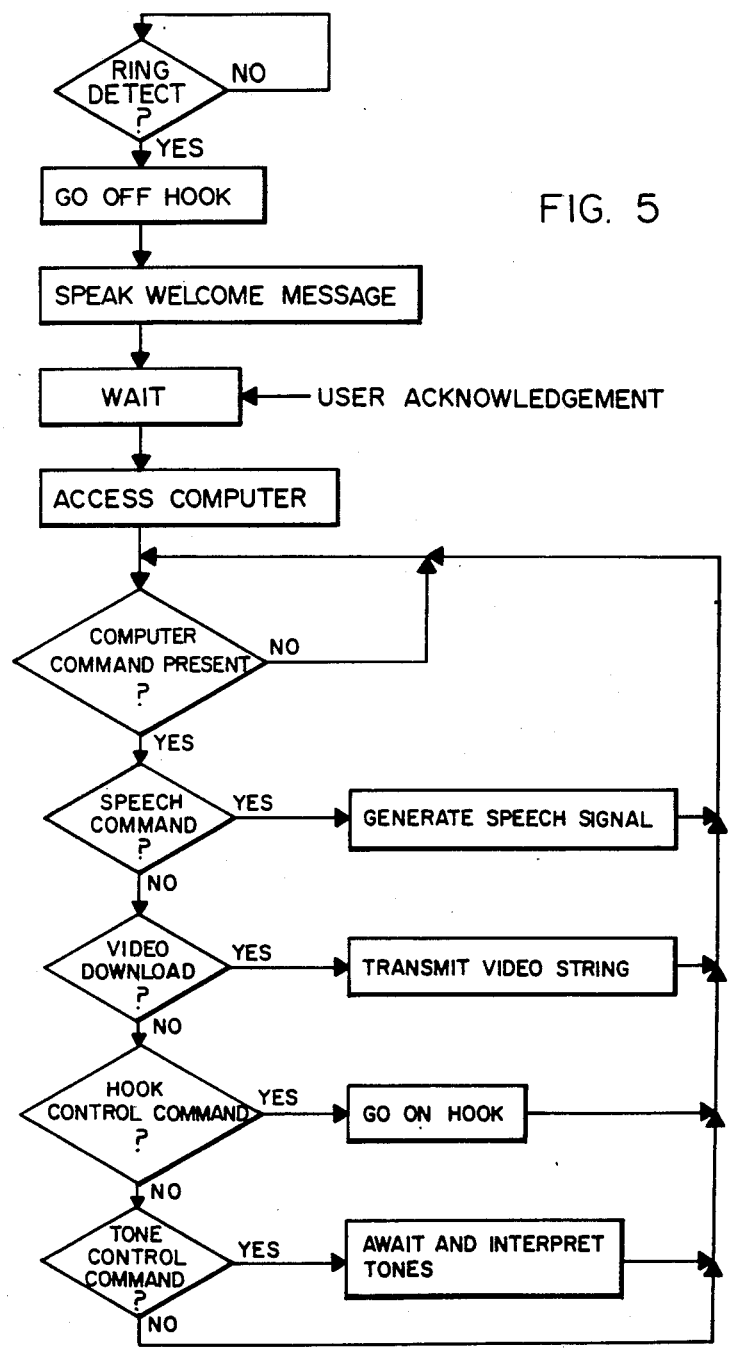
FIG. 5 is a flow chart of the base end processor program.

FIG. 5 illustrates the program of the base module microprocessor 50. When a ring is detected by ring detector 52, the microprocessor 50 takes the telephone line 16 off-hook and causes a welcome message to be transmitted by speech synthesizer 58. It then connects the line 16 to the tone recognition circuit 54 and waits for the receipt from the subscriber of an appropriate tone access and service request code.

Upon receipt of an appropriate code, the microprocessor 50 accesses the computer 12 and enters the user's service request. The microprocessor 50 then awaits the receipt of a command from the computer 12. This command may be a speech command, in which case the microprocessor 50 causes the speech synthesizer 58 to generate the appropriate words; or it may be a video download command, in which case the microprocessor 50 causes the modulator 56 to transmit a string of video data (prefaced by a command indicating to the subscriber microprocessor 40 that video data is about to be transmitted); or it may be a hook control command telling the microprocessor 50 that the data transmission is completed and to place the line 16 on hook; or it may be a tone control command telling the microprocessor 50 to await and interpret tone inputs from the subscriber through the tone recognition circuit 54.

It will be seen that the present invention provides a simple system for accessing a data base and visually displaying data without the need for a digital keyboard or bidirectional modems.

I claim:

1. A low-cost system for accessing a data base, comprising:
    (a) a data base including a computer at a base location, said data base computer being accessible by digital commands;
    (b) a telephone set at a subscriber location, said telephone set being capable of producing audio tones;
    (c) a telephone line interconnecting said base location and said subscriber location;
    (d) a display unit at said subscriber location for displaying data stored in said data base;
    (e) tone decoder means connected to said telephone line and said data base at said data base location for translating audio tone information into digital commands for accessing said data base;
    (f) a base module including modulator-only data transmitting means connected to said telephone line and said data base at said base location for transmitting digital data from said data base over said telephone line in response to said commands; and
    (g) a subscriber module including
        (i) demodulator-only data receiving means interconnecting said telephone line and said display means at said subscriber location for causing said display means to display said transmitted data;
        (ii) a refresh memory;
        (iii) video generating means for translating the contents of said refresh memory into a video display signal;
        (iv) microprocessor means connected to said data receiving means and said refresh memory for storing in said refresh memory digital display data received by said receiving means; and
        (v) self-disabling means responsive to the reception of a predetermined data code by said subscriber module for impeding operation of said subscriber module;
    (h) whereby communication toward said data base is by means of audio tones alone, and communication from said data base is at least in part by means of digital signals.

2. The system of claim 1, in which said self-disabling means is a nonvolatile memory connected to said microprocessor means, and said microprocessor means is programmed to execute its program only if a predetermined enabling code is stored in said nonvolatile memory; said microprocessor means being further programmed to erase said enabling code from said nonvolatile memory upon receipt of a predetermined data command by said microprocessor means.

* * * * *